United States Patent
Shieh

(10) Patent No.: US 6,207,277 B1
(45) Date of Patent: Mar. 27, 2001

(54) MULTIPLE INSULATING LAYER HIGH VOLTAGE WIRE INSULATION

(75) Inventor: Tsu-Chia Shieh, Framingham, MA (US)

(73) Assignee: Rockbestos-Surprenant Cable Corp., Chicago, IL (US)

( * ) Notice: Subject to any disclaimer, the term of this patent is extended or adjusted under 35 U.S.C. 154(b) by 0 days.

(21) Appl. No.: 08/993,489

(22) Filed: Dec. 18, 1997

(51) Int. Cl.$^7$ .................................................. D02G 3/00
(52) U.S. Cl. ...................... 428/375; 428/380; 428/398; 428/401; 428/446; 428/500; 428/515
(58) Field of Search ................................ 428/375, 398, 428/380, 383, 446, 500, 515; 174/110 FC, 110 R, 121 SR

(56) References Cited

U.S. PATENT DOCUMENTS

| | | | |
|---|---|---|---|
| 3,269,862 | 8/1966 | Lanza et al. | 117/218 |
| 3,546,014 | 12/1970 | Nicodemus | 117/218 |
| 3,911,192 | * 10/1975 | Aronoff et al. | 428/379 |
| 4,037,020 | 7/1977 | Ishii et al. | 428/518 |
| 4,051,298 | 9/1977 | Misiura et al. | 428/383 |
| 4,093,414 | 6/1978 | Swiatovy, Jr. | 425/113 |
| 4,184,001 | 1/1980 | Hildreth | 428/383 |
| 4,310,597 | 1/1982 | Checkland et al. | 428/383 |
| 4,477,523 | * 10/1984 | Biggs et al. | 428/389 |
| 4,547,328 | 10/1985 | Yuto et al. | 264/45.9 |
| 4,659,871 | * 4/1987 | Smith et al. | 174/113 R |
| 4,789,589 | 12/1988 | Baxter | 428/317.5 |
| 4,844,982 | * 7/1989 | Glaister | 428/421 |
| 5,059,483 | 10/1991 | Lunk et al. | 428/383 |
| 5,162,609 | 11/1992 | Adriaenssens et al. | 174/34 |
| 5,256,489 | * 10/1993 | Maringer et al. | 428/450 |
| 5,281,766 | 1/1994 | Hildreth | 174/120 |
| 5,358,786 | 10/1994 | Ishikawa et al. | 428/380 |
| 5,462,803 | 10/1995 | Wessels | 428/380 |
| 5,514,837 | 5/1996 | Kenny et al. | 174/411 |
| 5,614,319 | * 3/1997 | Wessels et al. | 428/379 |

FOREIGN PATENT DOCUMENTS

| | | | |
|---|---|---|---|
| 952991 | 8/1974 | (CA) | 337/59 |
| 1111175 | 10/1981 | (CA) | 204/91.41 |
| 1178673 | 11/1984 | (CA) | H01B/3/42 |
| 0360755 | 9/1989 | (EP) | H01B/7/34 |
| 938825 | 8/1961 | (GB) . | |

* cited by examiner

Primary Examiner—Bruce H. Hess
Assistant Examiner—B. Shewagreged
(74) Attorney, Agent, or Firm—Hayes, Soloway, Hennessey, Grossman & Hage, P.C.

(57) ABSTRACT

An electrical insulation composition comprising two or more crosslinked insulating layers wherein the layers comprise compatible polymer materials wherein crosslinking is present between the compatible layers to bond said layers together so that the crosslinked layers, when applied to a conductor, strip from said conductor without substantial separation. In addition, the crosslinked layers provide at least one of the following continuous service ratings when applied to 10 AWG or smaller conductor: i. greater than about 10 kV DC; ii. greater than about 5 kV AC.

51 Claims, No Drawings

MULTIPLE INSULATING LAYER HIGH VOLTAGE WIRE INSULATION

FIELD OF THE INVENTION

This invention relates to multiple layer high voltage wire insulation. More particularly, this invention relates to a two or more layer crosslinked/bonded insulation construction suitable for continuous use at elevated DC and/or AC voltages. The insulation can be made with excellent flame resistant properties and is particularly suitable for fine performing television set receiver cable.

BACKGROUND OF THE INVENTION

Over the years, a large number of prior art disclosures have focused on the development of cable insulation wherein said cable is of a multiple layer design. For example, as early back as 1935–1940, a two layer insulating cable design was disclosed, the first layer made from natural rubber, and an outer flame retardant layer containing polycholoroprene or neoprene rubber. By the mid 1940's, first layers reportedly contained poly(ethylene) followed by an outer layer of poly(vinyl chloride). In the 1960's first layers were manufactured from ethylene-propylene diene terpolymer, or ethylene propylene copolymers, and the outer layer comprised chlorosulfontated polyethylene, neoprene, or Hypalon (chlorosulphonated polyethylene) rubber. In the mid 1960's first layers were manufactured from crosslinked polyethylene, and the outer layers of crosslinked poly(vinylidine fluoride).

For example, in U.S. Pat. No. 3,269,862 there is disclosed an electrical insulation material which comprises a first inner layer of a polyolefin and a second outer layer of poly(vinylidine fluoride) in which the polymer comprising each of the layers is crosslinked.

In U.S. Pat. No. 3,546,014, there is disclosed a method of manufacturing thin wall wire by first providing a insulation layer of chemically crosslinked polyethylene over a metal conductor. The surface of the insulation is etched over its circumference, and a flame retardant coating of a thermosetting halogenated polyolefin is applied uniformly over the polyethylene insulation.

In U.S. Pat. No. 4,051,298, there is disclosed the combination of a previously cured copolymer of ethylene and propylene adjoined to a subsequently cured elastomeric blend of ethylene and propylene mixed with chlorosulfonated polyethylene. The combination of materials is said to provide various advantages when used in electrically conducting wire and cable products while also providing an overlying strippable semiconductive layer.

In U.S. Pat. No. 4,184,001, there is disclosed an insulation system for electrical conductors, which comprises a layer of crosslinked flurocarbon polymer, selected from ethylenetetrafluroethylene copolymer, ethylene chlorotrifluoroethylene copolymer and ethylene-tetrafluoroethylene terpolymer. This layer of polymer is then covered with a polyimide coating.

In U.S. Pat. No. 4,789,589 there is disclosed a conductor wire with an inner layer of insulation comprising cellular polyolefin and an outer layer of poly(vinyl chloride). The poly(vinyl chloride) is said to include a material compatible with the polyolefin (such as chlorinated PE), and is said to bond to the cellular polyolefin to hold the layers together.

In U.S. Pat. No. 5,059,483, there is disclosed shaped articles of crosslinked polymers comprising a first component having little or no crosslinking and high relative elongation, and a second component having a relatively high level of crosslinking and low elongation. The articles are described as being useful in the form of electrical insulation, the first component being adjacent to a wire or other conductor.

In U.S. Pat. No. 5,162,609, there is disclosed a fire resistant cable suitable for the transmission of high frequency signals which includes a core which contains a plurality of twisted pairs of insulated conductors and a jacket. The insulation system includes dual layers, the outer of which is a flame retardant plastic material. Specifically, the insulation system includes an inner layer of polyolefin plastic material and an outer layer of flame-retardant polyolefin plastic material characterized by a suitable low dissipation factor and dielectric constant. The outer layer of flame retardant polyethylene is about 0.003 inch.

U.S. Pat. No. 5,281,766 describes a motor lead wire that is overcoated with a primary insulation layer of polyolefin, protected by a jacket of poly(vinylidine fluoride) or a poly(vinylidine fluoride) copolymer having an approximate maximum thickness of 0.005 inches. The primary insulation is crosslinked and stabilized with a zinc salt of methylmercaptobenzimidazole and a hindered phenol anti-oxidant.

U.S. Pat. No. 5,358,786 describes a fire-resistant plenum-type electrical cable that is insulated with an inner layer of a flurocarbon copolymer and an outer layer of an abrasion resistant and flame resistant poly(vinyl chloride).

U.S. Pat. No. 5,514,837 describes a plenum cable having a plurality of insulated conductors enclosed by a jacket. In a preferred structure, one of the conductors is covered with an insulation layer of a flame retardant polyethylene or polypropylene resin, and one of the other conductors is insulated with fluorinated ethylene propylene (FEP).

As can be seen from the above review of the prior art, most of the multiple layer insulating cable designs reported to date, wherein the outer layer provides flame retardant characteristics, feature dissimilar material (resin) systems, which can contribute to incompatibility at the resin interfaces. In addition, none of the systems reported disclose multiple layer insulating design which can be crosslinked in a single crosslinking pass so that the multiple layers can be made to consistently stick together and strip together without significant separation. Furthermore, to date, a multiple layer insulating design of the aforementioned combined characteristics, that also provides product flexibility and a continuous service rating of greater than 10 kilovolts (kV) DC, or 5 kV AC such as is required in fine performing television set receiver cable, has not been available.

Accordingly, it is an object of this invention to overcome the disadvantages of the prior art and provide a multilayer insulating material, particularly suitable for high voltage wire insulation, wherein the layers are made compatible such that they will It is also an objective of the present invention to manufacture such multilayer construction from at least two layers, wherein the layers as noted have crosslinking at the interface, and wherein the outer layer is also made flame retardant, with good flexibility, and wherein the inner layer is chosen for outstanding dielectric breakdown characteristics.

Finally, it is also an object of this invention to optimally crosslink such a two or more layer type insulation construction in a single crosslinking pass so that the layers not only adhere to one another, but strip together without noticeable separation, and wherein the crosslinked layers also minimize moisture penetration.

SUMMARY OF THE INVENTION

In composition form, the present invention discloses an electrical insulation composition for DC voltage leads, comprising two or more crosslinked insulation layers wherein said layers comprise compatible polymer materials wherein crosslinking is present between said layers to bond said layers together so that said crosslinked layers, when applied to a conductor, strip from said conductor without substantial separation, and wherein said crosslinked layers provide, when applied to about 10 AWG or smaller conductor, at least one of the following continuous service ratings: i. greater than about 10 kV DC; ii. greater than about 5 kV AC.

In product form, the present invention discloses an insulated conductor wire comprising a conducting wire and surrounding insulation comprising two or more crosslinked layers bonded together, characterized in that said surrounding insulation provides, when applied to about 10 AWG or smaller conductor, at least one of the following continuous service ratings: i. greater than about 10 kV DC; ii. greater than about 5 kV AC, and wherein said bonded layers strip from said conductor without substantial separation and substantially prevent diffusion by air, moisture, electrolytes, and said insulated conductor wire passes a CSA FT1 or UL VW-1 vertical flame test.

Furthermore, in process form, the present invention discloses a process for preparing an insulated conductor wire containing a conductor wire and a surrounding insulation of two or more insulating layers, said process comprising selecting a polymer resin composition as a first insulating layer for coating said conductor wire, and coating said conductor wire with said first polymer resin. This is followed by selecting a second polymer resin composition compatible with said first insulating layer so that said second polymer resin will crosslink with said first insulating layer at the layer interface. The first insulating layer is then coated with this selected and compatible second polymer resin to form a second insulating layer followed by crosslinking said first and second insulating layers between said layers to bond said layers together to form the insulated conductor wire of the present invention.

DETAILED DESCRIPTION OF THE PREFERRED EMBODIMENTS

As noted above, the present invention first comprises an electrical insulation composition for high DC and AC voltage leads, comprising two or more crosslinked insulating layers wherein said layers comprise compatible polymer materials wherein crosslinking develops between said layers to bond said layers together. Preferably, this crosslinking is effected by irradiation, and one can also preferably employ accelerators/promotors to enhance the amount of crosslinking which develops herein.

Preferably said crosslinking accelerators/promotors contain at least one allyl or vinyl group selected from the group consisting of esters of methacrylic acid, polyfunctional vinyl monomers, and mixtures thereof. More preferably, the crosslinking accelerators/promotors are selected from the group consisting of triallyl isocyanurate (TAIC), triallylcyanurate, trimethylpropane trimethacrylate (TMPTMA), decamethylene glycol dimethacrylate, divinyl benzene, diallylphthalate, and mixtures thereof.

The electrical insulation herein is further characterized in that said bonding which is present between said layers substantially limits air, moisture or electrolytes from diffusing therein. Those skilled in the art will recognize that by limiting such diffusion, the present invention avoids the collection of air, moisture or electrolytes between the layers, which often leads to service problems such as dielectric breakdown or corona discharge.

Furthermore, with respect to the crosslinking between layers noted herein, such interlayer crosslinking is further defined and characterized in that the layers will strip or remove themselves from a conductor without substantial separation, and this has been found to be the case in the present invention even after sharp bending or repeated flexing. This stripping behavior therefor eliminates a long-standing problem in the insulation stripping operation for multiple layer designs when the layers separate.

In the broad context of the present invention, the polymer materials are therefore selected according to the compatibility criterion noted; i.e., they are selected so that the two or more layers will adhere to one another and crosslink across or between their surfaces when irradiated, chemically crosslinked or thermally crosslinked to provide the aforementioned electrical insulation characteristics. Preferably, it has been found that the polymer material in each layer is selected from the group consisting of thermoplastic elastomers, polyolefin polymers, chlorinated polyolefins polymer, alpha-olefin polymers, poly(vinyl chloride), ETFE copolymers, ECTFE copolymers, silicone elastomers, chlorinated polyethylene and mixtures thereof.

In a particular preferred embodiment, one of the layers, and preferably the outer layer, is also made flame retardant. This is done by selecting the outer layer according to the value of limiting oxygen index, which is a basic measure of the relative amount of oxygen necessary to sustain burning. Preferably, the limiting oxygen index of the outer layer is characterized by a limiting oxygen index greater than that of air; i.e, greater than about 21%, and therefor falling between 21–100%. With regards to such flame retardance, it is also preferred to flame retard the composition so that the layered composition also passes a CSA FT1 or UL VW-1 vertical flame test. Towards such goal, preferable flame retardants include antimony type compounds, such as antimony trioxide.

Alternatively, flame retardant polymer material can be used for the outer layer, which would effectively be the case when the outer layer comprises halogen containing resins such as poly(vinyl chloride) or chlorinated polyethylene.

In addition, with the above in mind, preferably one of the layers, such as the inner layer, is selected for outstanding dielectric breakdown characteristics, in some cases having flame retardance. By reference to outstanding dielectric breakdown characteristics, it is meant that the insulating layers are selected to provide a continuous service rating of greater than about 10 kV DC or 5 kV AC for the finished, crosslinked insulated wire.

WORKING EXAMPLES

Example 1

Wire insulation compounds of the following compositions were obtained by melt mixing of the ingredients.

|  | Compound A |
| --- | --- |
| HDPE | 55.0% by weight |
| SEBS block copolymer | 36.0 |
| TMPTMA | 2.5 |

-continued

|  |  |
| --- | --- |
| Antimony trioxide | 6.0 |
| Antioxidants | 0.5 |

|  | Compound B |
| --- | --- |
| HDPE | 13.2% by weight |
| SEBS block copolymer | 22.5 |
| EPDM | 4.5 |
| TMPTMA | 3.3 |
| Antimony trioxide | 23.6 |
| DBBPO | 16.9 |
| Antioxidants | 2.2 |
| Fillers | 13.8 |

Where SEBS: styrene-ethylene-butadiene-styrene
TMPTMA: trimethylpropoane trimethacrylate
DBBPO: decabromobiphenyl oxide An inner layer insulation, Compound A, was melt extruded over a solid 20 AWG tin coated copper conductor followed by melt extrusion of an outer layer insulation, Compound B, to give insulation wall thickness of 0.030 and 0.037 inch, respectively. The finished insulated wire gave an outside diameter of 0.165 inch. Subsequently this insulated wire was irradiated to 15 MR under an electron beam accelerator.

The two layers of insulation, after crosslinking by irradiation, were stripped off together from the conductor by using mechanical hand strippers and could not be separated by mechanically peeling off one layer from the other. When the insulation tubing was subjected to testing of tensile strength and elongation at break, the two layers broke simultaneously together. If the two layers are not bonded, the two layers would break separately, unless the two layers have identical elongation characteristics. Typical values of tensile strength are 2300 psi and 250% elongation when tested at 20 inches/minute.

An experimental test, Delamination Resistance, was devised to demonstrate the bonding of the two layers of insulation.

After subjecting this irradiation crosslinked insulated wire to 180 degree repeated bending for 1000 cycles at rate of 30 bendings per minute, the bent portion of the insulation tubing showed no separation of the two layers when tested for tensile strength and elongation.

The irradiation crosslinked insulated wire met and exceeded all the requirements and qualification by UL Style 3239, UL Subject 758 and CSA Standard 22.2 No. 16-1980 (TV-50) for 50 KV DC rating at 105° C. Among the stringent tests are vertical flame test (UL VW-1, CSA FT-1) and high voltage cut through test at 105° C. Other typical characteristics of this wire are as follows:

100% modulus at RT: 1600 psi

Dielectric breakdown in water:>150 KV DC

LOI of Compound B: 30%

When this type of wire is used as high voltage hook-up and lead wire in color TV receivers or projection TV, the absence of layer separation/delamination eliminates the arcing between layers seen on conventional dual layer construction of a non-bonded polyethylene inner layer and flame retarded PVC outer layer. This condition occurs as "treeing" from the anode cap, between the layers for as much as ½ inch up the cable and then arcing to the core conductor or through the entire insulation. This arcing can cause premature cable and/or system failure.

Example 2

An inner layer insulation, Compound C (TAIC, triallyl isocyanurate, to replace TMPTMA in Compound A), was melt extruded over a solid 20 AWG tin coated copper conductor followed by melt extrusion of an outer layer insulation, Compound B, to give insulation wall thickness of 0.024 and 0.028 inch, respectively. The finished insulated wire gave an outside diameter of 0.136 inch. Subsequently this insulated wire was irradiated to 15 MR under an electron beam accelerator.

This irradiation crosslinked insulated wire met all the requirements for 30 KV DC, 105° C. under UL Style 3239, UL Subject 758 and CSA (Standard 22.2 No. 16-1980).

The two layers of insulation, after crosslinking by irradiation, were stripped off together from the conductor with mechanical hand strippers and could not be separated by mechanically peeling off one layer from the other. When the insulation tubing was subjected to testing of tensile strength and elongation at break, the two layers broke simultaneously to give tensile strength of 2094 psi and elongation of 204% at break, at 20 inches/minute.

Example 3

An inner layer insulation, Compound A, was melt extruded over a solid 20 AWG tin coated copper conductor followed by melt extrusion of an outer layer insulation, Compound B, to give insulation wall thickness of 0.016 and 0.019 inch, respectively. The finished insulated wire gave an outside diameter of 0.102 inch. Subsequently this insulated wire was irradiated to 15 MR under an electron beam accelerator. When the irradiation crosslinked insulation tubing was subjected to testing of tensile strength and elongation at break, the two layers broke simultaneously to give tensile strength of 1880 psi and elongation of 175% at break.

The irradiation crosslinked insulated wire met all the requirements for 20 KV DC, 105° C. under UL Style 3239, UL Subject 758 and CSA TV-20 (CSA Standard 22.2 No. 16-1980). This cable also qualifies to these Standards for 15V DC, 105° C. rating.

Example 4

An ethylene-octene-copolymer was melt extruded over a 22 AWG (7 strands of 30 AWG) tin coated copper conductor as the inner layer insulation, followed by melt extrusion of an outer layer insulation, Compound D, to give insulation wall thickness of 0.035 and 0.043 inch, respectively. The finished insulated wire gave an outside diameter of 0.186 inch. Subsequently this insulated wire was irradiated to 12 MR under an electron beam accelerator. When the irradiation crosslinked insulation tubing was subjected to testing of tensile strength and elongation at break, the two layers broke simultaneously to give tensile strength of 2480 psi and elongation of 250% at break. This wire is suitable for 50 KV DC application according to UL Style 3239, UL Subject 758 and CSA Standard 22.2 No. 16-1980.

|  | Compound D |
| --- | --- |
| CPE (Blend of 25%/35% Cl) | 39.8% by weight |
| PVC | 10.7 |
| Antimony trioxide | 28.8 |
| Lead phthalate | 8.8 |
| TOTM | 1.7 |
| TMPTMA | 3.9 |
| Antioxidants | 3.2 |
| Red Color concentrate | 3.1 |

Example 5

Compound A (inner layer) and Compound B (outer layer) were melt extruded over a 18 AWG (19 strands of 30 AWG)

tin coated copper conductor to give insulation wall thickness of 0.040 and 0.055 inch, respectively. The finished insulated wire gave an outside diameter of 0.236 inch. Subsequently this insulated wire was irradiated to 15 MR under an electron beam accelerator. This wire is suitable for UL Standard 814 GTO-15 105° C. application, rated 15 KV AC, and also meets CSA Standard C22.2. No 127-95 requirements for 15 KV AC cable. This same cable qualifies to UL Style 3239, UL Subject 758 for rating at 60 KV DC, 105° C. The crosslinked insulation tube measured 1650 psi tensile strength and 200% elongation at break when tested at 20 inches/minutes, and there was no separation of layers.

Example 6

Compound A (inner layer) and Compound B (outer layer) were melt extruded over a 20 AWG solid tin coated copper conductor to give insulation wall thicknesses of 0.012 and 0.014 inch, respectively. The finished insulated wire gave an outside diameter of 0.084 inch. Subsequently this insulated wire was irradiated to 15 MR under an electron beam accelerator. The crosslinked insulation gave a tensile strength of 2200 psi and elongation at break of 230% at 20 inches/minute. This wire met the requirements for 10 KVDC 105° C. application, when tested according to UL 3239, UL Subject 758 and the layers would not separate when stripped from the conductor.

Delamination Resistance Test

Two-inch cable specimen with its conductor removed is bench marked for 0.2515 inch on the center section of insulation. A cutting tool which is adjusted to extrude 0.015–0.018 inch of sharp blade is passed across the cable insulation between the 0.2517 inch bench marks.

This notch cut section of the specimen shall be placed between two grips of an Instron tensile machine, which grips are 1.0 inch apart at the start of the test. The specimen is pulled at a rate of 20 inches per minute until rupture of both jacket and primary insulations.

Any separation (delamination) of the one insulation layer from the other insulation layer during the test indicates the absence of or weak bonding between the two or more layers. By definition, if there is no separation of the layers at break, the two layers are bonded. All of the Examples reported above showed no separation.

I claim:

1. An electrical insulation article comprising two or more crosslinked insulating layers defining an inner and outer layer wherein said layers comprise polymer materials selected from the group consisting of a thermoplastic elastomer, a polyolefin polymer, poly(vinyl chloride), a silicone elastomer, chlorinated polyethylene, and a mixture thereof, wherein crosslinking is present between said layers to bond said layers together so that said crosslinked layers, when applied to a conductor, strip from said conductor without substantial separation, wherein a 2.0" long sample of said bonded layers with said conductor removed cut at a thickness of about 50% into the outer layer subjected to a tensile test at a rate of about 20"/minute until rupture exhibits no separation between said bonded layers, and wherein said crosslinked layers provide, when applied to about 10 AWG or smaller conductor, at least one of the following continuous service ratings: i. greater than about 10 kV DC; and ii. greater than about 5 kV AC; and wherein at least one of said layers is flame retardant, characterized by a limiting oxygen index of about 21–100%.

2. The electrical insulation article of claim 1, wherein the continuous service rating is about 10–60 kV DC.

3. The electrical insulation article of claim 1 wherein the continuous service rating is 5 KV–15 KV AC.

4. The electrical insulation article of claim 1, wherein said continuous service rating is measured according to UL Style 3239, UL Subject 758, or CSA Standard C22.2 No. 16-1980.

5. The electrical insulation article of claim 1, wherein said continuous AC service rating is measured according to UL Standard 814 or CSA Standard C22.2 No 127-195.

6. The electrical insulation article of claim 1, wherein said bonding between said layers substantially limits air, moisture or electrolytes from diffusing therein.

7. The electrical insulation article of claim 1, further characterized in that said insulating composition over a conductor passes a CSA FT1 or UL VW-1 vertical flame test.

8. The electrical insulation article of claim 1 wherein the crosslinking of the insulating layers takes place via irradiation.

9. The electrical insulation article of claim 8 wherein a crosslinking accelerator/promotor is added to said polymer materials.

10. The electrical insulation article of claim 9, wherein said crosslinking accelerator/promotor contains at least one allyl or vinyl group selected from the group consisting of esters of methacrylic acid, polyfunctional vinyl monomers, and mixtures thereof.

11. The electrical insulation article of claim 10, wherein the crosslinking accelerators/promotor is triallyl isocyanurate, triallylcyanurate, trimethylpropane trimethacrylate, decamethylene glycol dimethacrylate, divinyl benzene, diallylphthalate or mixtures thereof.

12. An electrical insulation article for high voltage DC and AC leads, comprising two or more crosslinked insulating layers defining an inner and outer layer wherein said layers comprise polymer materials wherein crosslinking is present between said layers to bond said layers together so that said crosslinked layers, when applied to a conductor, strip from said conductor without substantial separation, wherein a 2.0" long sample of said bonded layers with said conductor removed cut at a thickness of about 50% into the outer layer subjected to a tensile test at a rate of about 20"/minute until rupture exhibits no separation
    between said bonded layers, and wherein said bonded layers substantially prevent diffusion by air, moisture or electrolytes, and wherein said crosslinked layers, when applied to about 10 AWG or smaller conductor, provide at least one of the following continuous service ratings: i. greater than about 10 kV DC; and ii. greater than about 5 kV AC; and wherein one of said crosslinked layers is flame retardant, characterized by a limiting oxygen index greater than about 21% and the ability to pass a CSA FT1 or UL VW-1 vertical flame test, and wherein said layers are selected from the group consisting of a thermoplastic elastomer, a polyolefin polymer, poly(vinyl chloride), a silicone elastomer, chlorinated polyethylene, and a mixture thereof.

13. An insulated conductor wire comprising a conducting wire and surrounding insulation comprising two or more crosslinked insulating layers defining an inner and outer layer bonded together selected from the group consisting of a thermoplastic elastomer, a polyolefin polymer, poly(vinyl chloride), a silicone elastomer, chlorinated polyethylene, and a mixture thereof, wherein said surrounding crosslinked insulation provides, when applied to about 10 AWG or smaller conductor, at least one of the following continuous service ratings: i. greater than about 10 kV DC; and ii. greater than about 5 kV AC; and wherein said bonded layers strip from said conductor without substantial separation, and wherein a 2.0" long sample of said bonded layers with said conductor removed cut at a thickness of about 50% into the outer layer subjected to a tensile test at a rate of about 20"/minute until rupture exhibits no separation between said bonded layers; and wherein at least one of said layers is flame retardant, characterized by a limiting oxygen index of about 21–100%.

14. The insulated conductor wire of claim 13, wherein said bonded layers substantially prevent diffusion by air, moisture or electrolytes.

15. The insulated conductor wire of claim 13, wherein said insulated conductor wire will pass a CSA FT1 or UL VW-1 vertical flame test.

16. The insulated conductor wire of claim 13, wherein said surrounding insulation provides, when applied to about 10 AWG or smaller conductor, at least one of the following continuous service ratings of: i. about 10–60 kV DC, as measured by UL Style 3339, UL Subject 758 or CSA Standard 22.2 No.16-1980; ii. about 5–15 kV AC, as measured by UL Standard 814 or CSA Standard 22.2 No. 127-95.

17. An electrical insulation article comprising two or more crosslinked insulating layers defining an inner and outer layer wherein one of said layers comprises a HDPE/styrene-ethylene-butadiene-styrene blend and another of said layers comprises a HDPE/styrene-ethylene-butadiene-styrene/EPDM blend and wherein crosslinking is present between said layers to bond said layers together so that said crosslinked layers, when applied to a conductor, strip from said conductor without substantial separation, wherein a 2.0" long sample of said bonded layers with said conductor removed cut at a thickness of about 50% into the outer layer subjected to a tensile test at a rate of about 20"/minute until rupture exhibits no separation between said bonded layers, and wherein said crosslinked layers provide, when applied to about 10 AWG or smaller conductor, at least on of the following continuous service ratings: i. greater than about 10 kV DC; and ii. greater than about 5 kV AC.

18. The electrical insulation article of claim 17 wherein the continuous service rating is about 50–60 kV DC.

19. The electrical insulation article of claim 17 wherein the continuous service rating is 5 KV–15 KV AC.

20. The electrical insulation article of claim 17, wherein said continuous service rating is measured according to UL Style 3239, UL Subject758, or CSA Standard C22.2 No. 16-1980.

21. The electrical insulation article of claim 17, wherein said continuous AC service rating is measured according to UL Standard 814 or CSA Standard C22.2 No. 127-195.

22. The electrical insulation article of claim 17, wherein said bonding between said layers substantially limits air, moisture or electrolytes from diffusing therein.

23. The electrical insulation article of claim 17, wherein at least one of said layers is flame retardant, characterized by a limiting oxygen index of about 21–100%.

24. The electrical insulation article of claim 17, further characterized in that said insulating composition over a conductor passes a CSA FT1 or UL VW-1 vertical flame test.

25. The electrical insulation article of claim 17 wherein the crosslinking of the insulating layers takes place via irradiation.

26. The electrical insulation article of claim 25 wherein a crosslinking accelerator/promotor is added to said polymer materials.

27. The electrical insulation article of claim 26, wherein said crosslinking accelerator/promotor contains at leas one allyl or vinyl group selected from the group consisting of esters or methacrylic acid, polyfunctional vinyl monomers, and mixtures thereof.

28. The electrical insulation article of claim 27, wherein the crosslinking accelerators/promotor is triallyl isocyanurate, triallylcyanuate, trimethylpropane trimethacrylate, decamethylen glycol dimethacrylate, divinyl benzene, diallylphthalate or mixtures thereof.

29. An electrical insulation article for high voltage DC and AC leads, comprising two or more crosslinked insulating layers defining an inner and outer layer wherein one of said layers comprises a HDPE/styrene-ethylene-butadiene-styrene blend, and another of said layers comprises a HDPE/styrene-ethylene-butadiene-styrene/EPDM blend, and wherein crosslinking is present between said layers to bond said layers together so that said crosslinked layers, when applied to a conductor, strip from said conductor without substantial separation, wherein a 2.0" long sample of said bonded layers with said conductor removed cut at a thickness of about 50% into the outer layer subjected to a tensile test at a rate of about 20"/minute until rupture exhibits no separation between said bonded layers, and wherein said bonded layers substantially prevent diffusion by air, moisture or electrolytes, and wherein said crosslinked layers, when applied to about 10 AWG or smaller conductor, provide at least one of the following continuous service ratings: i. greater than about 10 kV DC; and ii. greater than about 5 kV AC; and wherein said crosslinked layers provide a limiting oxygen index greater than about 21% and the ability to pass a CSA FT1 or UL VW-1 vertical flame test.

30. The electrical insulation article of claim 29 wherein the continuous service rating is about 50–60 kV DC.

31. The electrical insulation article of claim 29 wherein the continuous service rating is 5 KV–15 KV AC.

32. The electrical insulation article of claim 29, wherein said continuous service rating is measured according to UL Style 3239, UL Subject758, or CSA Standard C22.2 No. 16-1980.

33. The electrical insulation article of claim 29, wherein said continuous AC service rating is measured according to UL Standard 814 or CSA Standard C22.2 No. 127-195.

34. The electrical insulation article of claim 29, wherein at least one of said layers is flame retardant, characterized by a limiting oxygen index of about 21–100%.

35. The electrical insulation article of claim 29, further characterized in that said insulating composition over a conductor passes a CSA FT1 or UL VW-1 vertical flame test.

36. The electrical insulation article of claim 29 wherein the crosslinking of the insulating layers takes place via irradiation.

37. The electrical insulation article of claim 36 wherein a crosslinking accelerator/promotor is added to said polymer materials.

38. The electrical insulation article of claim 37, wherein said crosslinking accelerator/promotor contains at leas one allyl or vinyl group selected from the group consisting of esters or methacrylic acid, polyfunctional vinyl monomers, and mixtures thereof.

39. The electrical insulation article of claim 38, wherein the crosslinking accelerators/promotor is triallyl isocyanurate, triallylcyanuate, trimethylpropane trimethacrylate, decamethylen glycol dimethacrylate, divinyl benzene, diallylphthalate or mixtures thereof.

40. An insulated conductor wire comprising a conducting wire and surrounding insulation comprising two or more crosslinked insulating layers defining an inner and outer layer bonded together wherein one of said layers comprises a HDPE/styrene-ethylene-butadienestyrene blend, and another of said layers comprises a HDPE/styrene-ethylene-butadienestyrene/EPDM blend, wherein said surrounding crosslinked insulation provides, when applied to about 10 AWG or smaller conductor, at least one of the following continuous service ratings: i. greater than about 10 kV DC; and ii. greater than about 5 kV AC; and wherein said bonded layers strip from said conductor without substantial separation, and wherein a 2.0" long sample of said bonded layers with said conductor removed cut at a thickness of about 50% into the outer layer subjected to a tensile test at a rate of about 20"/minute until rupture exhibits no separation between said bonded layers.

41. The insulated conductor wire of claim 40 wherein the continuous service rating is about 50–60 kV DC.

42. The insulated conductor wire of claim 40 wherein the continuous service rating is 5 KV–15 KV AC.

43. The insulated conductor wire of claim 40, wherein said continuous service rating is measured according to UL Style 3239, UL Subject758, or CSA Standard C22.2 No. 16-1980.

44. The insulated conductor wire of claim 40, wherein said continuous AC service rating is measured according to UL Standard 814 or CSA Standard C22.2 No. 127-195.

45. The insulated conductor wire of claim 40, wherein said bonding between said layers substantially limits air, moisture or electrolytes from diffusing therein.

46. The insulated conductor wire of claim 40, wherein at least one of said layers is flame retardant, characterized by a limiting oxygen index of about 21–100%.

47. The insulated conductor wire of claim 40, further characterized in that said insulating composition over a conductor passes a CSA FT1 or UL VW-1 vertical flame test.

48. The insulated conductor wire of claim 40 wherein the crosslinking of the insulating layers takes place via irradiation.

49. The insulated conductor wire of claim 48 wherein a crosslinking accelerator/promotor is added to said polymer materials.

50. The insulated conductor wire of claim 48, wherein said crosslinking accelerator/promotor contains at leas one allyl or vinyl group selected from the group consisting of esters or methacrylic acid, polyfunctional vinyl monomers, and mixtures thereof.

51. The insulated conductor wire of claim 50, wherein the crosslinking accelerators/promotor is triallyl isocyanurate, triallylcyanuate, trimethylpropane trimethacrylate, decamethylen glycol dimethacrylate, divinyl benzene, diallylphthalate or mixtures thereof.

* * * * *

UNITED STATES PATENT AND TRADEMARK OFFICE
CERTIFICATE OF CORRECTION

PATENT NO.    : 6,207,277 B1
DATED         : March 27, 2001
INVENTOR(S)   : Shieh It is certified that error appears in the above-identified patent and that said Letters Patent is hereby corrected as shown below:

Column 2,
Line 54, please insert -- crosslink at the layer interface. --.

Column 7,
Line 30, "0.2515" should read -- 0.25 --.
Line 33, "0.2517" should read -- 0.25 --.

Column 9,
Line 36, "on" should read -- one --.
Line 40, "50" should read -- 10 --.
Line 66, "leas" should read -- least --.

Column 10,
Line 31, "50" should read -- 10 --.
Line 54, "leas" should read -- least --.
Line 67, "butadienestyrene" should read -- butadiene-styrene --.

Column 11,
Line 2, "butadienestyrene" should read -- butadiene-styrene --.
Line 14, "50" should read -- 10 --.

Column 12,
Line 15, "leas" should read -- least --.

Signed and Sealed this

Sixth Day of April, 2004

JON W. DUDAS
*Acting Director of the United States Patent and Trademark Office*